(12) United States Patent
Winters

(10) Patent No.: US 8,292,317 B1
(45) Date of Patent: Oct. 23, 2012

(54) TOW BAR FOR TRICYCLE OR BICYCLE

(76) Inventor: Mark R. Winters, DeLand, FL (US)

( * ) Notice: Subject to any disclaimer, the term of this patent is extended or adjusted under 35 U.S.C. 154(b) by 421 days.

(21) Appl. No.: 12/583,199

(22) Filed: Aug. 17, 2009

(51) Int. Cl.
*B62K 27/12* (2006.01)
*B62J 11/00* (2006.01)

(52) U.S. Cl. ................................ 280/292; 224/412

(58) Field of Classification Search .............. 280/292; 224/412, 409
See application file for complete search history.

(56) References Cited

U.S. PATENT DOCUMENTS

| | | | | |
|---|---|---|---|---|
| 581,309 | A * | 4/1897 | Savell | 280/292 |
| 675,453 | A | 6/1901 | Sturgess | |
| 693,379 | A | 2/1902 | Davis | |
| 1,149,807 | A | 8/1915 | Bascom | |
| 2,376,290 | A * | 5/1945 | Stewart | 294/26 |
| 2,391,608 | A * | 12/1945 | Wood | 294/115 |
| 2,476,594 | A * | 7/1949 | Gingrich | 294/104 |
| 2,629,611 | A | 2/1953 | Covington | |
| 2,645,505 | A | 7/1953 | Durand | |
| 3,275,337 | A * | 9/1966 | Lau | 280/87.1 |
| 3,622,181 | A * | 11/1971 | Smith | 280/476.1 |
| 3,741,578 | A * | 6/1973 | Dumont | 280/24 |
| 3,765,365 | A * | 10/1973 | Gillespie | 114/218 |
| 3,797,846 | A * | 3/1974 | Pevic | 280/24 |
| 4,296,879 | A * | 10/1981 | Jordening | 224/510 |
| 4,729,576 | A * | 3/1988 | Roach | 280/493 |
| 4,736,963 | A * | 4/1988 | Bettencourt | 280/460.1 |
| 5,171,052 | A * | 12/1992 | Cunningham | 294/210 |
| 5,217,240 | A * | 6/1993 | Gardenhour et al. | 280/282 |
| 5,219,104 | A * | 6/1993 | Hinschlager et al. | 224/412 |
| 5,348,327 | A * | 9/1994 | Gieske | 280/47.331 |
| 5,531,494 | A * | 7/1996 | Singleton | 294/209 |
| 5,749,592 | A | 5/1998 | Marchetto | |
| 5,810,231 | A * | 9/1998 | Kravitz | 224/532 |
| 6,050,580 | A | 4/2000 | Pawelek | |
| 6,135,479 | A | 10/2000 | Tibay et al. | |
| 6,155,582 | A | 12/2000 | Bourbeau | |
| 6,270,100 | B1 | 8/2001 | Wunderlich | |
| 6,286,847 | B1 | 9/2001 | Perrin | |
| 6,592,138 | B1 | 7/2003 | Li | |
| 6,983,947 | B2 | 1/2006 | Asbury et al. | |
| 7,234,719 | B2 | 6/2007 | Giese | |
| 2005/0115512 | A1 * | 6/2005 | Fritsch | 119/454 |
| 2006/0066075 | A1 | 3/2006 | Zlotkowski | |

FOREIGN PATENT DOCUMENTS

EP 69610 A1 * 1/1983
GB 2211159 A * 6/1989

* cited by examiner

*Primary Examiner* — Tashiana Adams
*Assistant Examiner* — Daniel Yeagley
(74) *Attorney, Agent, or Firm* — Paul S. Rooy PA

(57) ABSTRACT

A tow bar for tricycle or bicycle. The tow bar includes a handle attached at one end of a spine, an arm attached at an opposite end of the spine, and fingers attached to the arm. Each finger has a finger hook sized to engage a vehicle handlebar. In operation, the fingers are engaged with a vehicle, and the handle used to pull the vehicle by its handlebar. The position of the fingers along the arm and the angle of the fingers relative to the arm is adjustable, which allows the tow bar to be quickly and easily adapted to different handlebar designs. Padding may be centrally installed on the handlebar, and the fingers spaced so as to engage the handlebar on either side of the padding, thus keeping the tow bar centrally disposed on the handlebar.

9 Claims, 2 Drawing Sheets

TOW BAR FOR TRICYCLE OR BICYCLE

BACKGROUND OF THE INVENTION

1. Field of the Invention

This invention relates to tow bars, and in particular to a tow bar for tricycle or bicycle.

2. Background of the Invention

Small children typically ride tricycles before attempting to learn how to ride a bicycle. A common problem associated with taking a child out riding on his or her tricycle is the slow speed typically achievable by a young tricycle rider. This can slow down the adults and larger children on the outing.

Another problem is that young children tend to tire easily. Thus, it would be desirable to have some species of tow bar to pull a child on his or her tricycle along, so that the child on the tricycle may have a chance to rest.

Existing Designs

One commercially available design involves pushing a tricycle with an elongate member. This design requires that the tricycle being pushed have been manufactured with docking provisions for one end of the elongate member. This design is not retrofittable to existing tricycles, and suffers from complexity, and thus higher cost.

U.S. Pat. No. 6,135,479 was issued Tibay et al. for another push design, which involved mating one end of a rigid elongate member with the rear deck of a tricycle. This design also required that the tricycle have a deck to which one end of the elongate pushing member could be docked, which is not possible with all existent tricycle designs.

U.S. Pat. No. 2,645,505 was issued Dorand for a combination pulling member and brake for a tricycle. While this design provided greater stability and utility than the push designs, it required special tools to be mounted to the front of the tricycle, and was not easily retrofittable to every tricycle design.

Thus, it would be desirable to provide an easily installed and removed tow bar for tricycles with universal applicability to existing tricycles.

SUMMARY OF THE INVENTION

Accordingly, it is an object of the present invention to provide a tow bar for tricycle or bicycle which is engageable with a tricycle or bicycle handlebar. Design features allowing this object to be accomplished include a handle rigidly attached to one end of a spine, an arm rigidly attached to an opposite end of the spine, and a finger sized to fit around a handlebar attached at each end of the arm. Advantages associated with the accomplishment of this object include being able to tow a tricycle or bicycle so as to permit the rider to keep up with the rest of the party, to permit the rider to rest from pedaling, and/or to help teach the rider how to pedal.

It is another object of the present invention to provide a tow bar for tricycle or bicycle which is easily engageable and removable from a tricycle or bicycle handlebar. Design features allowing this object to be accomplished include a handle rigidly attached to one end of a spine, an arm rigidly attached to an opposite end of the spine, and a finger sized to slidably fit around a handlebar attached at each end of the arm. Advantages associated with the accomplishment of this object include being able to removably use the instant tow bar for tricycle or bicycle with a wide variety of existing tricycles and bicycles, and to easily remove the tow bar for transportation or storage.

It is another object of the present invention to provide a tow bar for tricycle or bicycle which may releasably be attached to the handlebar of a tricycle or bicycle. Design features allowing this object to be accomplished include a handle rigidly attached to one end of a spine, an arm rigidly attached to an opposite end of the spine, and a finger sized to slidably fit around a handlebar attached at each end of the arm. A benefit associated with the accomplishment of this object is increased safety for the driver of the tricycle or bicycle, because the tow bar can be used to steady and maintain upright a tricycle or bicycle to which it is attached.

It is another object of this invention to provide a tow bar for tricycle or bicycle which is easily adaptable to a number of different tricycle or bicycle handlebars. Design features allowing this object to be achieved include a tow bar arm having a plurality of arm bores, at least one finger comprising a finger stem with a thread sized to slidably fit through a corresponding arm bore, a lock washer, and a nut sized to mate with the finger stem thread. Benefits associated with reaching this objective include greater flexibility and speed of adapting the tow bar for tricycle or bicycle to a wide variety of existing tricycle and bicycle handlebars.

It is yet another object of this invention to provide a tow bar for tricycle or bicycle which is inexpensive to produce. Design features allowing this object to be achieved include the use of components made of readily available materials, and established processes, to manufacture the tow bar for tricycle or bicycle. Benefits associated with reaching this objective include reduced cost, and hence increased availability.

BRIEF DESCRIPTION OF THE DRAWINGS

The invention, together with the other objects, features, aspects and advantages thereof will be more clearly understood from the following in conjunction with the accompanying drawings.

Two sheets of drawings are provided. Sheet one contains FIGS. 1 and 2. Sheet two contains FIGS. 3 and 4.

DETAILED DESCRIPTION OF THE PREFERRED EMBODIMENT

Figure 1:
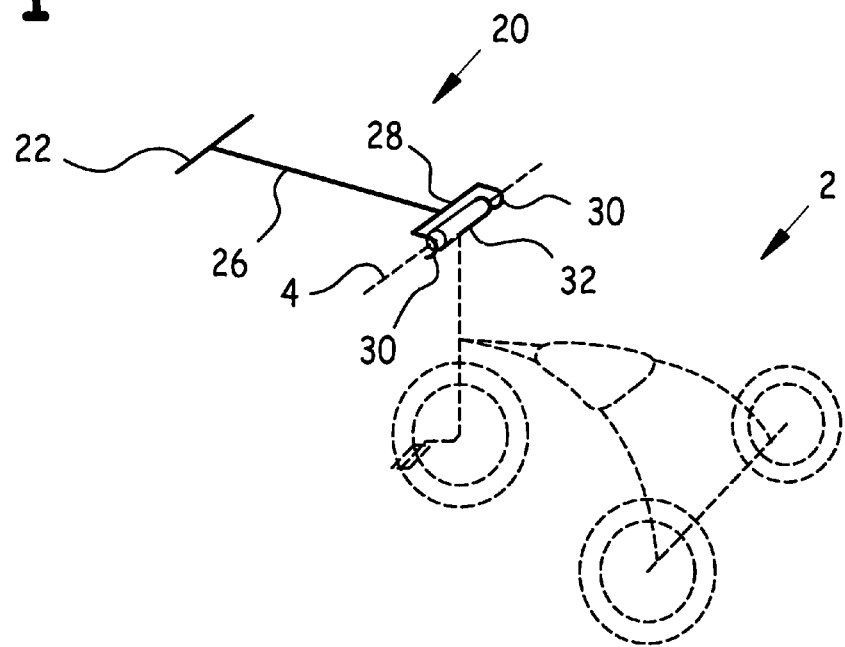
FIG. 1 is a rear quarter isometric view of a tow bar for tricycle or bicycle removably attached to a tricycle.
Figure 2:
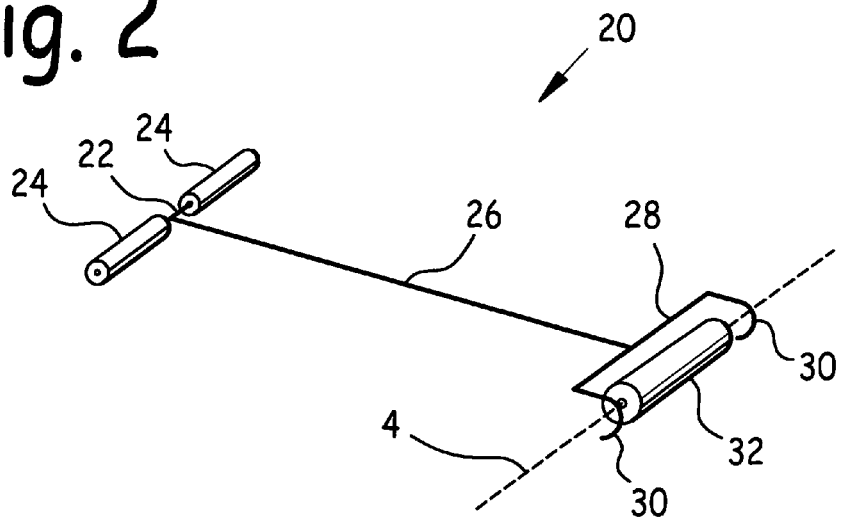
FIG. 2 is a rear quarter isometric view of a tow bar for tricycle or bicycle.

FIG. 1 is a rear quarter isometric view of tow bar 20 for tricycle or bicycle removably attached to tricycle 2. FIG. 2 is a rear quarter isometric view of tow 20 bar.

As may be noted from these figures, tow bar 20 comprises handle 22 attached to one end of spine 26, and arm 28 attached at an opposite end of spine 26. Handle 22, spine 26, and arm 28 are substantially rectilinear, and substantially co-planar.

Handle 22 is substantially perpendicular to spine 26, and spine 26 is attached to handle 22 substantially at its midpoint. Handle 24 may comprise handle grip(s) 24 encircling handle 24 made of a soft material such as foam rubber or plastic, in order to render gripping handle 22 more comfortable.

Arm 28 is substantially perpendicular to spine 26, and spine 26 is attached to arm 28 substantially at its midpoint.

Figure 3:
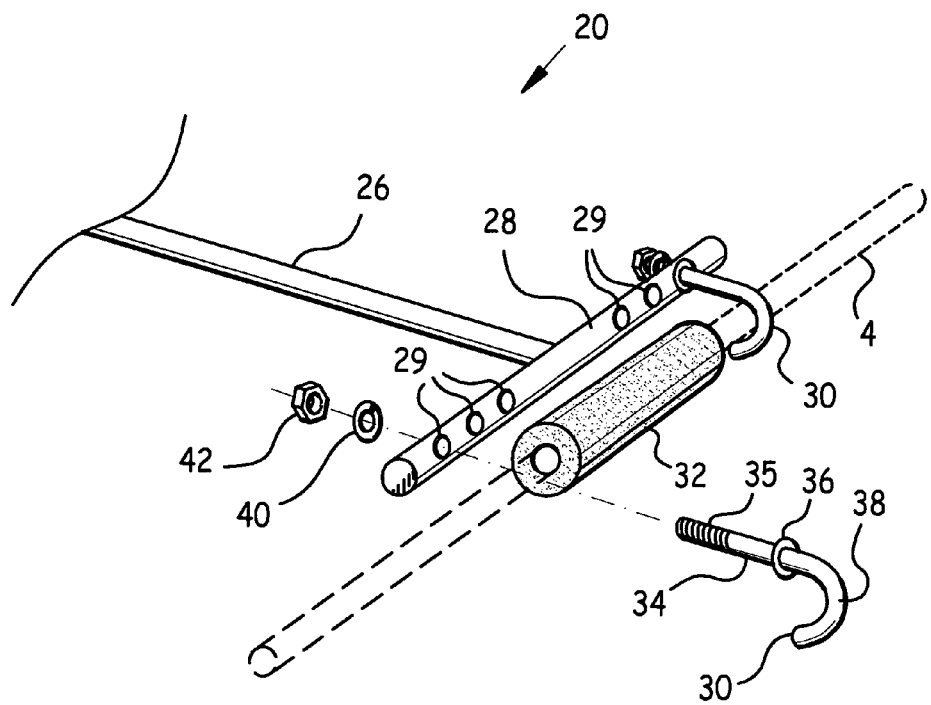
FIG. 3 is a rear quarter isometric view of a tow bar for tricycle or bicycle showing the rear part of its spine, its arm, and its fingers removably attached to a handlebar, with padding around that portion of the handlebar between the fingers.

FIG. 3 is a rear quarter isometric view of a tow bar 20 for tricycle or bicycle showing the rear part of its spine 26, its arm 28, and its fingers 30 removably attached to a handlebar 4, with padding 32 around that portion of the handlebar 4 between fingers 30.

Figure 4:
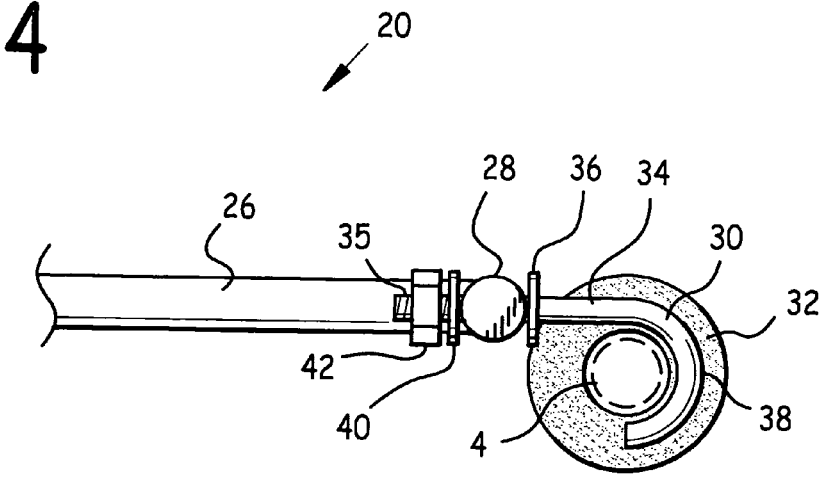
FIG. 4 is a side view of a tow bar for tricycle or bicycle showing the rear part of its spine, its arm, and its fingers removably attached to a handlebar, with padding around the handlebar between the fingers.

FIG. 4 is a side view of a tow bar 20 for tricycle or bicycle showing the rear part of its spine 20, its arm 28, and its fingers 30 removably attached to a handlebar 4, with padding 32 around handlebar 4 between fingers 30.

Referring now also to these figures, we observe that at least one finger 30 is rigidly attached to arm 28. Each finger 30 comprises a finger hook 38 attached to finger stem 34. Each finger stem 34 is attached to arm 28 substantially perpendicular to arm 28.

Finger hook 38 is attached to an end of finger stem 34 opposite arm 28. Finger hook 38 is sized to admit handlebar 4. In the preferred embodiment, when viewed from the side as depicted in FIG. 4, the shape of finger hook 38 was a circle arc of substantially 180 degrees.

In the preferred embodiment, tow bar 20 comprised two fingers 30 attached to arm 28, one on either side of spine 26. The two finger stems 34 were substantially co-planar, although not necessarily co-planar with the plane containing handle 22, spine 26, and arm 28.

Thus, in use as depicted in FIG. 1, fingers 30 were placed over handlebar 4 with finger hooks 38 down, finger hooks 38 were engaged with handlebar 4, and handle 22 was used to tow tricycle 2.

Although the figures depict tow bar 20 being used to tow a tricycle 2, it is intended to fall within the scope of this disclosure that tow bar 20 for tricycle or bicycle be used to tow any appropriate vehicle possessed of a handlebar, be it tricycle, bicycle, moped, scooter, motorcycle, motorized trike, four-wheeled vehicle with handlebar, etc.

FIGS. 3 and 4 depict an alternate embodiment tow bar 20 which incorporates adjustability of the attachment point of fingers 30 along the length of arm 28, in order to permit tow bar 20 accommodate different handlebar 4 sizes and shapes associated with different vehicle handlebar designs.

In the embodiment tow bar 20 depicted in FIGS. 3 and 4, arm 28 incorporates a plurality of arm bores 29 along the length of arm 28. Finger stem 34 comprises finger stem thread 35 at an end of finger stem 34 opposite finger hook 38. Each arm bore 29 is sized to slidably admit finger stem 34.

Finger 30 comprises finger stem stop 36. Finger stem stop 36 is sized to exceed the diameter of arm bore 29. Thus, the threaded end of finger stem 34 may be slid into an appropriate arm bore 29 until finger stem stop 36 butts up against arm 28, then lock washer 40 is slid over the end of finger stem 34 protruding through arm 28, and nut 42 is tightened onto finger stem thread 35 to securely attach the finger 30 to arm 28 through the desired arm bore 29, and with finger hook 38 at the desired angle to arm 28.

As may be readily observed in FIG. 3, the attachment point of fingers 30 along the length of arm 28 may be changed simply by removing nut 42 and lock washer 40 from their corresponding finger stem 34, sliding the finger 30 out of the arm bore 29 and into another arm bore 29, and re-installing lock washer 40 and nut 42 onto finger stem 34. This procedure permits the separation between fingers 30 to be changed, by changing the position of fingers 30 along the length of arm 28, in order to permit tow bar 20 accommodate different handlebar 4 sizes and shapes associated with different vehicle handlebar designs.

In addition, the embodiment depicted in FIGS. 3 and 4 permits the angle between finger hooks 38 and arm 28 to be varied as desired, so as to be able to attach fingers 30 to arm 28 at the best angle to fit the specific handlebar 4 with which tow bar 20 is to be engaged. Finger hook 38 may be coated with a material appropriate to prevent abrasion between finger hook 38 and handlebar 4, such as plastic coating, rubber coating, epoxy coating, synthetic coating, etc.

Some tricycles are delivered with padding 32 centrally disposed on handlebar 4. One of the functions of padding 32 is to protect young drivers of tricycle 2 from injury caused by hitting their heads or other body parts against handlebar 4, in event of a sudden stop. Padding 32 may also be retrofitted onto handlebar 4, as desired.

As is illustrated in the figures, the placement of fingers 30 along handlebar 4 may be such as to allow padding 32 to fit between fingers 30. Because the cross-sectional size of padding 32 is too large to be embraced by finger hooks 38, padding 32 prevents arm 28 from translating laterally relative to handlebar 4, because padding 32 is entrapped between fingers 30. Thus, padding 32 helps maintain tow bar 20 centered on handlebar 4, in proper position to tow the vehicle attached to handlebar 4, without introducing a turning moment or turning tendency due to asymmetrical towing of handlebar 4.

In the preferred embodiment handle 22, spine 26, arm 28 and fingers 30 were made of metal, iron, stainless steel, plastic, nylon, synthetic, or other appropriate material. Lock washer 40 and nut 42 were commercially available, off-the-shelf components. Handle grip 24 and padding 32 were made of foam rubber, rubber, cloth, plastic, or other appropriate material.

While a preferred embodiment of the invention has been illustrated herein, it is to be understood that changes and variations may be made by those skilled in the art without departing from the spirit of the appending claims.

DRAWING ITEM INDEX 2 tricycle
4 handlebar
20 tow bar
22 handle
24 handle grip
26 spine
28 arm
29 arm bore
30 finger
32 padding
34 finger stem
35 finger stem thread
36 finger stem stop
38 finger hook
40 lock washer
42 nut

I claim:

1. In combination, a tow bar for tricycle or bicycle, and a vehicle having a handlebar, said tow bar for tricycle or bicycle comprising a spine, a handle attached at one end of said spine, an arm attached to an opposite end of said spine, a finger attached to said arm on each side of said spine, each said finger comprising a finger hook attached ached to one end of a finger stem, an opposite end of said finger stem being attached to said arm, said finger, hooks being sized to admit said vehicle handlebar, said handle, spine, and arm being substantially rectilinear and substantially co-planar, said spine being attached to said handle at substantially a midpoint of said handle and substantially perpendicular to said handle, said spine being attached to said arm at substantially a midpoint of said arm and substantially perpendicular to said arm, said finger stem being substantially rectilinear, and a side view shape of each said finger hook being substantially a circular arc of substantially 180 degrees;

said vehicle comprising padding on said handlebar, said handlebar being disposed within said finger hooks, a cross-sectional dimension of said padding being sized too large to be admitted into said finger hooks, said padding being centrally disposed around said handlebar and between said hooks, whereby said tow bar is maintained centrally disposed on said handlebar by said padding.

2. The tow bar for tricycle or bicycle of claim 1 further comprising a plurality of arm bores in said arm, each said arm bore being sized to slidably admit a corresponding said finger stem, a thread on said finger stem, a nut sized to mate with said finger stem thread, and a finger stem stop on said finger stem, said finger stem stop being sized to large to fit through said arm bore, said finger stem extending through said arm bore, said arm being disposed between said finger stem stop and said nut.

3. The tow bar for tricycle or bicycle of claim 2 further comprising a lock washer sized to fit over said finger stem, said lock washer being disposed on said finger stem between said nut and said arm.

4. The tow bar for tricycle or bicycle of claim 3 further comprising at least one handle grip on said handle, whereby use of said tow bar may be rendered more comfortable.

5. A tow bar for tricycle or bicycle in combination with a vehicle handlebar, said tow bar comprising a spine, a handle attached at one end of said spine, an arm attached to an opposite end of said spine, one finger attached to said arm on either side of said spine, each said finger being sized to admit said handlebar, said handle, said spine, and said arm being substantially rectilinear and substantially co-planar, said spine being attached to said handle at substantially a midpoint of said handle and substantially perpendicular to said handle, said spine being attached to said arm at substantially a midpoint of said arm and substantially perpendicular to said arm each said finger comprising a finer hook attached to one end of a finger stem an opposite end of said finger stem being attached to said arm, said finger stem being substantially rectilinear, a side view shape of said finger hook being substantially a circular arc of substantially 180 degrees, and a cross-sectional shape of said handlebar being substantially a circle of smaller diameter than said finger hook circular arc cross-sectional shape;

said handlebar comprising padding centrally disposed on said handlebar, a cross-sectional dimension of said padding being sized too large to be admitted into said finger hook, said padding being centrally disposed around said handlebar and between said hooks, whereby said tow bar is maintained centrally disposed on said handlebar by said padding.

6. The tow bar for tricycle or bicycle in combination with a vehicle handlebar of claim 5 further comprising a plurality of arm bores in said arm, each said arm bore being sized to slidably admit a corresponding said finger stem, a thread on said finger stem, a nut sized to mate with said finger stem thread, and a finger stem stop on said finger stem, said finger stem stop being sized too large to fit through said arm bore, said finger stem extending through said arm bore, said arm being disposed between said finger stem stop and said nut.

7. The tow bar for tricycle or bicycle in combination with a vehicle handlebar of claim 6 further comprising a lock washer sized to fit over said finger stem, said lock washer being disposed on said finger stem between said nut and said arm.

8. The tow bar for tricycle or bicycle in combination with a vehicle handlebar of claim 7 further comprising at least one handle grip on said handle, whereby use of said tow bar may be rendered more comfortable.

9. The tow bar for tricycle or bicycle in combination with a vehicle handlebar of claim 8 further comprising a coating on each said finger hook, whereby abrasion between each said finger hook and said handlebar may be minimized.

* * * * *

UNITED STATES PATENT AND TRADEMARK OFFICE
CERTIFICATE OF CORRECTION

| | |
|---|---|
| PATENT NO. | : 8,292,317 B1 |
| APPLICATION NO. | : 12/583199 |
| DATED | : October 23, 2012 |
| INVENTOR(S) | : Mark R. Winters |

It is certified that error appears in the above-identified patent and that said Letters Patent is hereby corrected as shown below:

Column 4 Line 60, Claim 1: Is: "...attached ached to one end..." Should Be: "...attached to one end..."

Column 6 Line 2, Claim 5: Is: "...to said arm each said finger..." Should Be: "...to said arm, each said finger..."

Column 6 Line 3, Claim 5: Is: "...a finger stem an opposite..." Should Be: "...a finger stem, an opposite..."

Signed and Sealed this
Twenty-ninth Day of January, 2013

David J. Kappos
*Director of the United States Patent and Trademark Office*